United States Patent

Bobeck et al.

[15] 3,701,127

[45] Oct. 24, 1972

[54] MAGNETIC DOMAIN PROPAGATION ARRANGEMENT INCLUDING MEDIUM WITH GRADED MAGNETIC PROPERTIES

[72] Inventors: Andrew Henry Bobeck, Chatham; Hyman Joseph Levinstein, Berkeley Heights, both of N.J.

[73] Assignee: Bell Telephone Laboratories Incorporated, Murray Hill, N.J.

[22] Filed: March 31, 1971

[21] Appl. No.: 129,866

[52] U.S. Cl...340/174 TF, 340/174 YC, 340/174 SR

[51] Int. Cl...........................G11c 19/00, G11c 11/14

[58] Field of Search..................................340/174 TF

[56] References Cited

UNITED STATES PATENTS 3,540,019 11/1970 Bobeck et al. ........340/174 TF 3,643,238 2/1972 Bobeck et al. ........340/174 TF

OTHER PUBLICATIONS

IBM Technical Disclosure Bulletin Vol. 13, No. 11 April 1971 pg. 3,220

*Primary Examiner*—James W. Moffitt

*Attorney*—R. J. Guenther and Kenneth B. Hamlin

[57] ABSTRACT

The movement of single wall domains in an internal layer of a film of magnetic material permits operation unencumbered by surface defects or interactions with substrates on which the film is formed for bias fields over a range which is large compared to the range of bias fields characteristic of films in which single wall domains extend from surface to surface.

16 Claims, 7 Drawing Figures

INVENTORS A.H. BOBECK
H.J. LEVINSTEIN
BY Herbert M. Shapiro
ATTORNEY

MAGNETIC DOMAIN PROPAGATION ARRANGEMENT INCLUDING MEDIUM WITH GRADED MAGNETIC PROPERTIES

FIELD OF THE INVENTION

This invention relates to data processing arrangements and, more particularly, to such arrangements in which information is stored as a pattern of single wall domains.

BACKGROUND OF THE INVENTION

A single wall domain is a reversed magnetized domain encompassed by a single domain wall which closes on itself in a layer of material in which such a domain can be moved. Normally, the material in which domains of this type are moved has a preferred axis of magnetization normal to the plane of movement. A single wall domain thus has its magnetization in a first direction along the axis and the remainder of the layer has its magnetization in a second (or reference) direction along the axis. The domains are free to move anywhere in the plane of the layer and their movement can be observed under a microscope with polarized light by either the Faraday or Kerr effect.

The diameter of a domain is maintained at some nominal value during operation of a single wall domain arrangement by a bias field in the reference direction tending to constrict the domains as is well known. Normally, a domain can assume a diameter between that at which spontaneous collapse occurs and that at which a domain extends out into a strip—a factor of above three difference between the minimum and maximum diameters. Accordingly, in practical arrangements a range of bias values exists for which a single wall domain arrangement is operative. A relatively wide range of bias field values, however, would permit increased operating speeds and reduce constraints on variations in the thickness of a layer in which domains move and in the uniformity of magnetic moment in the layer.

Further, a convenient procedure for making layers of material suitable for the movement of single wall domains comprises the formation of a magnetic film on a suitable substrate typically by liquid phase or chemical vapor deposition techniques which produce epitaxial films on suitably prepared substrates such as Gadolinium gallium garnet. The technique requires steps of polishing the substrate prior to film formation and of polishing the surface of the film once formed. The reason for these polishing steps is to reduce the number of defects normally present at a surface of a crystal to improve crystal growth in the first instance and to eliminate surface imperfections which hamper domain movement in both instances.

BRIEF DESCRIPTION OF THE INVENTION

This invention is based on the recognition that movement of domains unhampered by surface imperfections and substrate interaction where the domains are stable over a relatively wide range of bias values can be achieved if domains are moved in a sublayer which does not include one or both surfaces of the epitaxial film in which the sublayer is defined. Such an arrangement is realized in one embodiment of this invention by an epitaxial film which has a magnetic moment graded from its top to its bottom surface. For example, an epitaxial film grown from the liquid phase on a suitable substrate with a relatively low magnetic moment at its two surfaces and a maximum magnetic moment in the central plane or sublayer of the film exhibits a single wall domain which does not intersect either surface of the film for suitable bias fields. In a second embodiment, cone-shaped domains are exhibited at each surface of an epitaxial film for a graded magnetic moment which is at a minimum in a central sublayer of the film. Layers of materials with magnetic properties graded in this manner exhibit domains which have been found to be stable over a relatively wide range of bias field values.

DETAILED DESCRIPTION

Figure 1:
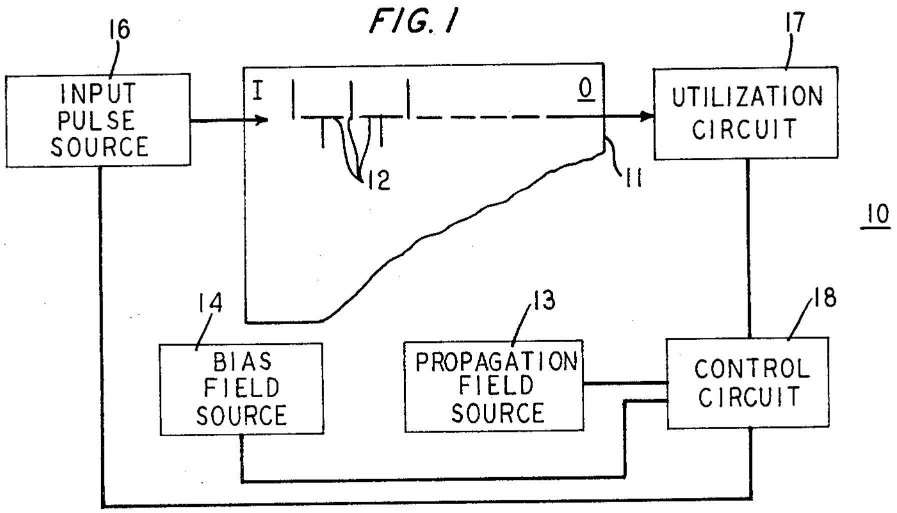
FIG. 1 is a schematic illustration of a single wall domain arrangement in accordance with this invention.

FIG. 1 shows a domain propagation arrangement 10 including a layer of magnetic material 11 advantageously comprising graded magnetic properties which, for certain bias values, confine domains to movement in a sublayer which does not include either the surface of the layer, the interface between the layer and a substrate, or either. The general organization of the arrangement is discussed first followed by a description of alternative domain layer configurations along with the preparation of the layers.

The surface of layer 11 is shown with a pattern of T-and-bar shaped elements 12 juxtaposed therewith. The elements are illustratively of magnetically soft material, (alternatively, grooves in the surface of layer 11), arranged to define a representative domain propagation path for domain movement from an input position I to an output position O in an arrangement generally known as a "field access" arrangement. The illustrative pattern of elements is well known in the art to move domains therealong in response to a magnetic field reorienting (viz. rotating) in the plane of layer 11. A source for such a field is represented by block 13 labelled propagation field source in FIG. 1. A suitable source of bias field is represented by block 14 of FIG. 1.

Domains of a nominal diameter, maintained by the bias field and moved in response to the in-plane field, move from input position I to output position O. Suitable arrangements for providing and detecting domains at such input and output positions are disclosed in U.S. Pat. No. 3,555,527 of A. J. Perneski issued Jan. 12, 1971 and copending application Ser. No. 882,900 now U.S. Pat. No. 3,609,720 of W. Strauss, and are represented in FIG. 1 by blocks 16 and 17 designated "input pulse source" and "utilization circuit," respectively. Sources 13, 14, 16, and circuit 17 are under the control of a control circuit represented by block 18 of FIG. 1.

Figure 2:
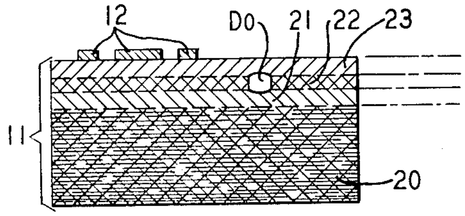
FIGS. 2, 3, and 4 are schematic illustrations of side views of alternative magnetic layer configurations for the arrangement of FIG. 1.

FIG. 2 is a side view of layer 11, showing a substrate layer 20 and an epitaxial layer which we can envision as comprising a multilayer structure comprising sublayers 21, 22, and 23. Sublayers 21, 22, and 23 are characterized by different magnetic moments provided illustratively by a liquid phase epitaxial growth process discussed hereinafter. Of course, it is to be understood that these sublayers are not actually discrete layers and the fine structure shown in the figure is merely for convenience of description.

Figure 3:
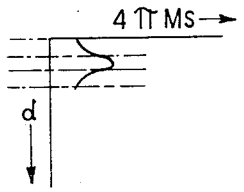

In FIG. 2, sublayer 22 has a relatively high magnetic moment resulting in a representative domain DO being confined to that layer at relatively high bias values. To be specific, FIG. 3 shows a graph of magnetic moment ($4 \Pi M_s$) against distance *d* from the top surface of layer 11 as viewed in FIG. 2 where M is the saturation magnetization of the material. The moment is at some preselected value at the surface of the layer and increases to a maximum in sublayer 22, decreasing in sublayer 23 to, say, the preselected value at the surface. For relatively low values of bias field, domain DO extends through all three sublayers 21, 22, and 23 from the top surface as viewed to the interface with substrate 20 being confined to thinner and thinner layers of the epitaxial film for increasingly higher bias fields.

Sublayer 22 is intended to represent any internal layer in which the domain DO does not contact the top surface of the epitaxial film or the interface with the substrate 20 or either.

In the foregoing embodiment in which the magnetic moments of sublayers 21 and 23 are relatively low compared to that of sublayer 22, domain DO may have a barrel-shaped cross section. On the other hand, if the moment of sublayers 21 and 23 is relatively high compared with sublayer 22, domain DO may appear as two domains, each designated DO in FIG. 4, for relatively high bias fields. In this latter instance, each of the domains has a conical cross section, the two domains converging into a single hourglass shape at relatively low values of bias field at which a domain appears (also) in sublayer 22. The magnetic moment profile for this embodiment is shown in FIG. 5 as a function of distance *d* from the top surface of layer 11. The moment can be seen to lie at some preselected value at the top surface of the epitaxial film and at the interface with substrate 20, dropping to a minimum in sublayer 22.

Figure 4:
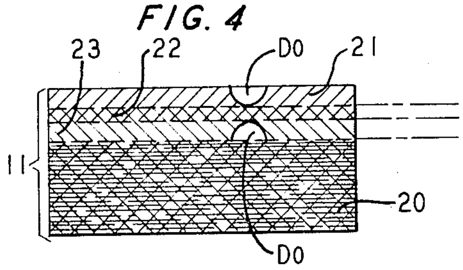
Figure 5:
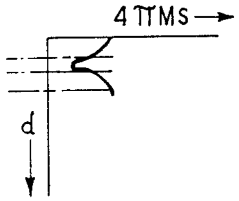
FIGS. 5, 6, and 7 are graphs of magnetic moment of the magnetic layers of FIGS. 2, 3, and 4 versus distance from the surface of the layers.
Figure 6:
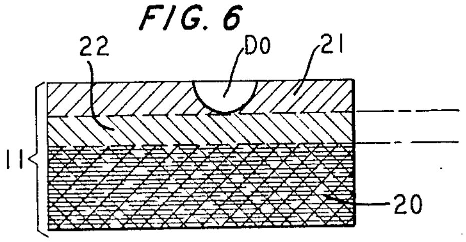
Figure 7:
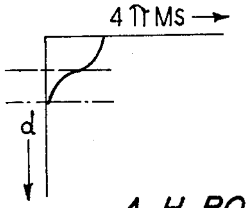

FIG. 6 shows an embodiment in which sublayer 23 of FIGS. 4 and 5 is vanishingly thin. In this configuration, magnetic moment is assumed to be at a maximum at the top surface of layer 21 decreasing to zero at the interface between sublayer 22 and the substrate 20. The moment profile is depicted in FIG. 7.

For operation of single wall domain arrangements in which the domains are confined to a layer of given thickness and having a relatively uniform magnetic moment, a domain is stable for bias values between the value at which a domain collapses spontaneously and the value at which it runs out into a strip configuration as stated hereinbefore. The diameter of a domain at the latter value is typically three times the diameter at the former value. For a typical material, the bias values at collapse and strip out are typically 65 and 80 oersteds, respectively. Where magnetic moment is graded, in accordance with this invention, as a function of thickness of the layer in which domains are confined, the range of bias values for which such domains are stable is increased typically to from 65 oersteds at collapse to 120 oersteds at strip out.

The reason for the increased bias range can be understood in terms of the different thicknesses of the epitaxial layer occupied by a domain at different values of bias field. For example, in the embodiment of FIG. 2, domain DO extends through layers 21, 22 and 23 intersecting the top surface of the epitaxial film and the surface of the substrate for a low bias value near the value at which a domain runs out into a strip. For increasingly higher values of bias, the domain occupies increasingly thinner sublayers as shown, for example, in FIG. 2. Since the magnetic moment of the material occupied by a domain for increasingly higher biases is increasingly higher, increasingly higher increments of bias are required to reduce the thickness of the layer in which the domain is confined. Consequently, a mechanism is provided in which different bias fields are associated with domains which occupy different thicknesses of the layer in which such domains can be moved.

Of course, similar bias range enhancements are realized with the arrangements of FIGS. 4 and 6. But, the arrangement of FIG. 2 is characterized by the added advantage of domain movement therein being unhampered by surface defects as indicated hereinbefore. The arrangement of FIGS. 6 and 7, for example, results in similar benefits by having domains confined to a layer spaced apart from the interface between the epitaxial film and the substrate.

Single wall domain propagation arrangements with graded magnetic moment properties of the type shown in, for example, FIGS. 2 and 3 have been made by liquid phase epitaxial techniques. For example, a substrate of GdGa garnet cut from a crystal grown by the Czochralski technique was polished with Syton polish and dipped consecutively in liquids of Europium Erbium gallium garnet ($EuEr_2Ga_{.5}Fe_{4.5}O_{12}$), Europium Erbium, aluminum garnet ($Eu_{1.5}Er_{1.5}Al_{.4}Fe_{4.6}O_{12}$) and again Europium Erbium gallium garnet, each for eight minutes at a temperature of 930° C., the magnetic moment of the film produced each time the substrate is dipped being determined by garnet composition as is well known. Each film had a thickness of 5 microns. The moment of the consecutively grown layers was 100 gauss, 200 gauss and 100 gauss. The moment profile of the films so grown was characterized by abrupt changes at the interface between the films, a profile approximated by the curve of FIG. 3. Gradual changes in moment are achieved by, for example, proper temperature control as is well understood in the art.

The embodiment of FIGS. 6 and 7 is characterized by an additional attractive feature particularly when formed with an abrupt change in magnetic moment as might be obtained by, for example, liquid phase epitaxial technique in which a single layer film is dipped again into a melt to produce the appropriate surface layer thereon. The advantage is that such a structure is characterized by only a single type of single wall domain, all the domains therein having essentially uniform properties. This in contradistinction to otherwise highly attractive single layer films typically with high mobility characteristics which have been found to exhibit single wall domains (domain isotopes) with varying properties such as collapse diameters, mobilities, etc. In the realization of a single wall domain mass memory, a medium with domains of uniform properties ensures to preferably less complicated system.

Domains having 5 micron diameters are moved in the resulting crystal by offset magnetic fields as, for example, by the field access arrangement described above. A rotating in-plane field of about 20 oersteds causes such movement. Polishing defects on the surface of the deposited films and inclusions in the surface of the substrate were not observed to effect domain movement. Coercivities of about 0.1 oersted were observed at bias fields of 90 oersteds for which domains in such a crystal are constrained to, say, sublayer 22 of FIG. 2. Such coercivities are substantially lower than about 0.3 oersted which result typically for bias fields which permit domains to occupy sublayers 21, 22, and 23 of FIG. 2.

Although the invention is described in terms of a graded magnetic moment, like results are achieved by a similarly graded wall energy characteristic. Also, both these properties may be graded in the same crystal to produce similar results. In the case where wall energy is graded, the increased range of bias values is achieved also by a decreased length of a domain, but from the standpoint of domain stability, an increase in wall energy is equivalent to a decrease in magnetic moment.

Arrangements which permit an increased bias range, in accordance with this invention, result in domain diameters relatively invariant to excursions in bias fields which might occur during operation. Since variations in domain diameter cause variations in device performance, such arrangements relieve constraints in drive circuitry and overlay design. A layer with relatively invariant domains, for example, may be understood to be operable at relatively high speeds because domains in such layers are tolerant of relatively widely varying biases. The movement of domains, of course, requires a field gradient across the domain and the greater the gradient, the faster the domain moves, and the higher the resulting operating speeds.

What has been described is considered only illustrative of the principles of this invention. Therefore, various modifications can be devised by those skilled in the art in accordance with those principles yet within the spirit and scope of this invention.

What is claimed is:

1. A magnetic arrangement comprising a layer of material in which single wall domains can be moved, said layer comprising a first surface and being characterized by a variation in magnetic properties with distance from said first surface, said variation being such that single wall domains in said layer are confined to increasingly thinner sublayers of said layer for increasingly higher values of bias field.

2. An arrangement in accordance with claim 1 wherein said magnetic properties comprise a magnetic moment which varies from a prescribed value at said surface to a maximum at a first distance from said surface and to said prescribed value at a second distance from said surface.

3. An arrangement in accordance with claim 1 wherein said magnetic properties comprise a magnetic moment which varies from a prescribed value at said surface to a minimum at a first distance from said first surface.

4. An arrangement in accordance with claim 3 wherein said magnetic moment increases to said prescribed value at a second distance from said surface greater than said first distance.

5. An arrangement in accordance with claim 1 including means for providing a bias field of a polarity to constrict said domains.

6. An arrangement in accordance with claim 5 also including means for moving single wall domains in said layer.

7. An arrangement in accordance with claim 6 wherein said means for moving comprises magnetic elements having geometries and being disposed to exhibit attracting domain patterns which change in a manner to move said domains along a path from input to output positions in response to a magnetic field reorienting in the plane of said layer.

8. An arrangement in accordance with claim 7 also including means for providing single wall domains in said path at said input position selectively and means for detecting the presence and absence of domains at said output position.

9. An arrangement comprising a layer of material in which single wall domains can be moved and having first and second surfaces, said layer having a gradient in its magnetic properties along an axis normal to said surfaces to define a plurality of different sublayers therein for sustaining domains of different diameters, and bias means for constricting domains to a diameter sustained in one of said sublayers.

10. A magnetic arrangement comprising a layer of material in which single wall domains can be moved, said layer comprising a first surface and being characterized by a variation in magnetic moment with distance from said first surface, said variation being such that single wall domains in said layer are confined to increasingly smaller thicknesses of said layer for increasingly higher values of bias field.

11. A magnetic arrangement comprising a layer of material in which single wall domains can be moved, said layer comprising a first surface and being characterized by a change in magnetic properties with distance from said first surface, said change being such that domains in said layer occur indifferent sublayers thereof at different values of bias field.

12. A magnetic arrangement in accordance with claim 11 wherein said change in magnetic properties comprises a change in magnetic moment.

13. A magnetic arrangement in accordance with claim 12 wherein said layer is characterized by a magnetic moment of a first value and includes a surface sublayer wherein said magnetic moment is of a second value higher than said first value such that in the presence of a bias field in excess of a first value single wall domains occur only in said surface sublayer.

14. A magnetic arrangement in accordance with claim 13 wherein said layer is formed as an epitaxially grown film on a nonmagnetic substrate.

15. A magnetic arrangement in accordance with claim 13 also including biasing means for providing a bias field in excess of said first value for maintaining domains in said surface sublayer at a nominal operating size.

16. A magnetic arrangement in accordance with claim 15 also including means for moving domains in said layer.

* * * * *